(12) United States Patent
Lee et al.

(10) Patent No.: US 6,859,715 B2
(45) Date of Patent: Feb. 22, 2005

(54) TORQUE-BIASING SYSTEM

(75) Inventors: Hyeongcheol Lee, Ann Arbor, MI (US); Clive McKenzie, Southfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 21 days.

(21) Appl. No.: 10/130,171

(22) PCT Filed: Oct. 11, 2001

(86) PCT No.: PCT/US01/31814
§ 371 (c)(1),
(2), (4) Date: Aug. 5, 2002

(87) PCT Pub. No.: WO02/31645
PCT Pub. Date: Apr. 18, 2002

(65) Prior Publication Data
US 2003/0070857 A1 Apr. 17, 2003

Related U.S. Application Data

(60) Provisional application No. 60/239,486, filed on Oct. 11, 2000.

(51) Int. Cl.[7] ................................................. G06F 7/00
(52) U.S. Cl. ............................. 701/89; 701/72; 701/90; 180/247; 180/248
(58) Field of Search ............................. 701/89, 70, 69, 701/83, 84, 90; 180/233, 240, 247, 248, 243; 192/85 C; 475/84, 86, 88, 89, 150, 231, 234, 240, 221, 206

(56) References Cited

U.S. PATENT DOCUMENTS

| 473,444 A | 4/1892 | Barney |
| 1,677,996 A | 7/1928 | Wingquist ............... 192/58.91 |

(List continued on next page.)

FOREIGN PATENT DOCUMENTS

| EP | 0825362 | 2/1998 |
| EP | 0886083 | 12/1998 |
| EP | 0911204 | 4/1999 |
| GB | 2 187 824 A | 9/1987 |
| GB | 2252801 | 2/1992 |
| JP | 401182127 | 7/1989 |
| JP | 1261553 | 10/1989 |
| JP | 200062495 | 2/2000 |
| JP | 200074096 | 3/2000 |
| JP | 2001-163079 | 6/2001 |

OTHER PUBLICATIONS

M. Okcuoglu, "A Descriptive Analysis of Gerodisc Type Limited Slip Differentials and All Wheel Drive Couplings", Society of Automotie Engineers, Inc. Copyright 1995, pp. 15–20.

WO 87/06668, Published Nov. 05, 1987, Applicant: Scheidegger, Zwicky, Werner & Co., International Application No. PCT/CH86/00060.

WO 00/12915, Published Mar. 9, 2000, Applicant: McLaren Automotive Group, International Application No. PCT/US99/20054.

WO 94/29618, Published Dec. 22, 1994, Applicant: Vrijburg, International Application No. PCT/NL94/00130, entitled: Differential With Continuous Variable Power Distribution.

*Primary Examiner*—Jacques H. Louis-Jacques
(74) *Attorney, Agent, or Firm*—Brinks Hofer Gilson & Lione

(57) ABSTRACT

A torque-biasing system (10) includes a torque-biasing device (12) and a control unit (14) for use in a motor vehicle. The torque-biasing system is preferably installed in a vehicle having a first front wheel (18) with a first rotational speed and second wheel (20) with a rear rotational speed and an engine (22) with a torque output. The control unit (14) functions to determined when and how to bias the torque output of the front and rear wheels, and to control the torque-biasing device (12) based on this determination.

10 Claims, 2 Drawing Sheets

U.S. PATENT DOCUMENTS

| | | | | |
|---|---|---|---|---|
| 2,175,520 A | | 10/1939 | Frederickson | 74/650 |
| 2,623,619 A | | 12/1952 | Clerk | 192/35 |
| 2,986,024 A | | 5/1961 | Power | 464/25 |
| 3,118,292 A | | 1/1964 | Schroter et al. | 464/36 |
| 3,350,961 A | | 11/1967 | Dodge | 475/88 |
| 3,724,289 A | | 4/1973 | Kennicutt | 475/88 |
| 3,831,461 A | | 8/1974 | Mueller | 475/89 |
| 4,012,968 A | | 3/1977 | Kelbel | 475/88 |
| 4,462,272 A | | 7/1984 | Roper | 475/240 |
| 4,493,227 A | | 1/1985 | Schmid | 475/89 |
| 4,630,505 A | | 12/1986 | Williamson | 475/90 |
| 4,633,735 A | | 1/1987 | Sakurai et al. | 475/2 |
| 4,676,336 A | | 6/1987 | Hiramatsu et al. | 180/233 |
| 4,719,817 A | | 1/1988 | Azuma | 475/235 |
| 4,719,998 A | | 1/1988 | Hiramatsu et al. | 477/175 |
| 4,730,514 A | | 3/1988 | Shikata et al. | 475/88 |
| 4,750,125 A | * | 6/1988 | Leppek et al. | 701/83 |
| 4,752,211 A | * | 6/1988 | Sabin | 431/90 |
| 4,779,698 A | | 10/1988 | Iwata | 180/247 |
| 4,794,539 A | * | 12/1988 | Wallentowitz et al. | 701/70 |
| 4,838,118 A | | 6/1989 | Binkley | 475/86 |
| 4,841,809 A | | 6/1989 | Jolly | 475/163 |
| 4,867,012 A | | 9/1989 | McGarraugh | 475/72 |
| 4,884,653 A | | 12/1989 | Kouno | 180/233 |
| 4,898,686 A | * | 2/1990 | Johnson et al. | 252/389.2 |
| 4,905,808 A | | 3/1990 | Tomita et al. | 475/88 |
| 4,949,594 A | | 8/1990 | Galhotra | 74/650 |
| 4,960,011 A | | 10/1990 | Asano | 192/85 AA |
| 4,966,268 A | | 10/1990 | Asano et al. | 74/650 |
| 4,974,471 A | | 12/1990 | McGarraugh | 475/24 |
| 4,987,967 A | | 1/1991 | Kouno | 180/233 |
| 4,995,491 A | | 2/1991 | Hiramatsu et al. | 192/58.91 |
| 5,007,886 A | | 4/1991 | Holmquist et al. | 475/231 |
| RE33,742 E | | 11/1991 | Blessing et al. | 475/150 |
| 5,092,825 A | | 3/1992 | Goscenski, Jr. et al. | 475/150 |
| 5,099,944 A | * | 3/1992 | Kageyama et al. | 180/249 |
| 5,172,787 A | | 12/1992 | Kobayashi | 180/197 |
| RE34,209 E | | 3/1993 | McGarraugh | 475/72 |
| 5,189,930 A | | 3/1993 | Kameda | 74/657 |
| 5,194,053 A | | 3/1993 | Sano et al. | 475/89 |
| 5,201,820 A | | 4/1993 | Hamada et al. | 180/233 |
| 5,329,805 A | * | 7/1994 | Yahagi et al. | 73/9 |
| 5,346,032 A | * | 9/1994 | Sasaki | 180/233 |
| 5,415,598 A | | 5/1995 | Sawase et al. | 475/86 |
| 5,445,574 A | | 8/1995 | Sekiguchi et al. | 475/346 |
| 5,456,641 A | | 10/1995 | Sawase | 475/86 |
| 5,469,950 A | | 11/1995 | Lundstrom et al. | 192/86 |
| 5,490,070 A | * | 2/1996 | Kiryu et al. | 701/70 |
| 5,536,215 A | | 7/1996 | Shaffer et al. | 475/88 |
| 5,542,316 A | | 8/1996 | Spooner et al. | 74/650 |
| 5,690,002 A | | 11/1997 | Showalter | 74/650 |
| 5,735,764 A | | 4/1998 | Shaffer et al. | 475/88 |
| 5,827,145 A | | 10/1998 | Okcuoglu | 475/88 |
| 5,853,342 A | * | 12/1998 | Pritchard et al. | 475/206 |
| 5,888,163 A | | 3/1999 | Shaffer et al. | 475/88 |
| 5,893,812 A | | 4/1999 | Narai et al. | 475/86 |
| 5,915,513 A | | 6/1999 | Islev, Jr. et al. | 192/35 |
| 5,916,052 A | | 6/1999 | Dick | 475/198 |
| 5,938,555 A | | 8/1999 | Leeper | 475/88 |
| 5,938,556 A | | 8/1999 | Lowell | 475/88 |
| 5,941,788 A | | 8/1999 | Shaffer et al. | 475/88 |
| 5,964,126 A | | 10/1999 | Okcuoglu | 74/650 |
| 5,979,631 A | | 11/1999 | Lundstrom | 192/85 CA |
| 5,984,822 A | | 11/1999 | Schreier et al. | 475/230 |
| 6,001,040 A | | 12/1999 | Engle | 475/88 |
| 6,019,694 A | | 2/2000 | Forrest et al. | 475/150 |
| 6,048,286 A | | 4/2000 | Perry | 475/88 |
| 6,056,658 A | | 5/2000 | Illmeier | 475/88 |
| 6,095,939 A | | 8/2000 | Burns et al. | 475/88 |
| 6,119,061 A | | 9/2000 | Schenkel et al. | 701/42 |
| 6,176,800 B1 | | 1/2001 | Shaffer et al. | 475/88 |
| 6,186,258 B1 | | 2/2001 | Deutschel et al. | 180/197 |
| 6,213,241 B1 | | 4/2001 | Kita et al. | 180/248 |
| 6,216,841 B1 | | 4/2001 | Hofer | 192/103 F |
| 6,332,522 B1 | | 12/2001 | Morse et al. | 192/85 AA |
| 2002/0142878 A1 | * | 10/2002 | Bansbach et al. | 475/204 |
| 2002/0144851 A1 | * | 10/2002 | Porter | 180/247 |

* cited by examiner

TORQUE-BIASING SYSTEM

CROSS-REFERENCE TO OTHER APPLICATIONS

The application on this invention relates to U.S. Provisional Patent Application Ser. No. 60/239,486, filed 11 Oct. 2000 and entitled "Torque Control Device".

TECHNICAL FIELD

This invention relates generally to the field of torque-biasing systems and, more particularly, to the field of torque-biasing systems for a vehicle with a first front wheel and a rear wheel.

BACKGROUND

Some conventional vehicles include all-wheel-drive capabilities. These vehicles power two wheels during high-traction situations to enhance fuel-economy, and power all four wheels during reduced-traction situations to enhance road traction and stability. Torque-biasing devices are conventionally used to transfer the torque output from the engine source away from a first wheel and towards a second wheel during the reduced-traction situation.

During a reduced-traction situation, one of the wheels of the vehicle often has a much faster rotational speed than another wheel. Torque-biasing devices are conventionally controlled based upon the difference between the rotational speeds of a first wheel and a second wheel. Once the torque-biasing device is activated, the vehicle powers all four wheels and the effect of the reduced-traction situation is hopefully minimized.

A problem arises, however, during a tight turning maneuver of the vehicle with a conventional torque-biasing system. During such maneuver, each of the four wheels of the vehicle track a different turning radius and, consequently, are turning at a different rotational speed. As an example, the number of tire tracks of a typical vehicle change from two tire tracks to four tire tracks as the vehicle turns into a snowy driveway. In this situation, the torque-biasing system may improperly interpret the different rotational speeds of the wheels as a reduced-traction situation and may improperly power all four wheels. In a tight turning situation, the powering of all four wheels causes a disturbing "crow hop" situation as the torque-biasing device attempts to reduce the rotational speed difference between the wheels of the vehicle, which must turn at a different rotational speed. Thus, there is a need in the field of torque-biasing systems to provide a torque-biasing system with an improved control algorithm and control unit.

DESCRIPTION OF THE PREFERRED EMBODIMENT

The following description of the preferred embodiment of the invention is not intended to limit the invention to this preferred embodiment, but rather to enable any person skilled in the art of torque-biasing systems to make and use an embodiment of the invention.

Figure 1:
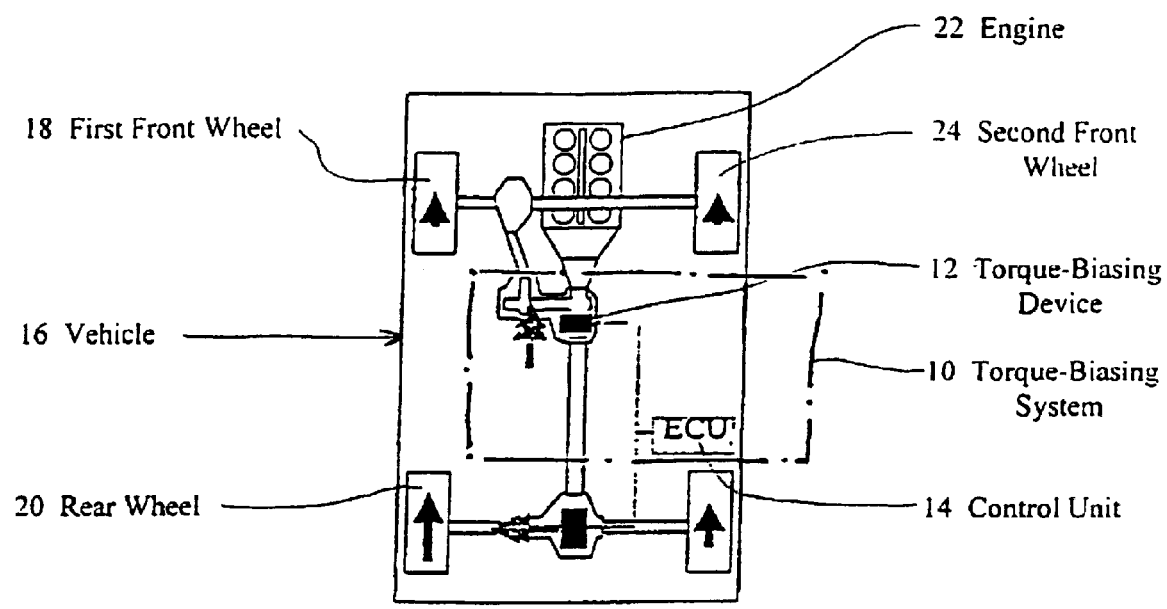
FIG. 1 is a schematic view of the torque-biasing system of the preferred embodiment, shown in a vehicle.

As shown in FIG. 1, the torque-biasing system 10 of the preferred embodiment includes a torque-biasing device 12 and a control unit 14. The torque-biasing system 10 is preferably installed and used in a vehicle 16 having a first front wheel 18 with a first front rotational speed, a rear wheel 20 with a rear rotational speed, and an engine 22 with a torque output. More preferably, the torque-biasing system 10 is installed and used in an all-wheel-drive ("AWD") vehicle, such as a truck or so-called sport-utility-vehicle, having two front wheels, two rear wheels, and a longitudinally-mounted engine. With this arrangement, the torque-biasing device 12 functions as a "transaxle-type" torque-biasing device to transfer the torque output away from the rear wheels and towards the front wheels during a reduced-traction condition. The torque-biasing system 10, however, may be installed and used in any suitable environment. For example, the torque-biasing system 10 may be installed and used in an AWD vehicle, such as a minivan or sedan, having a transversely-mounted engine. With this arrangement, the torque-biasing device 12 functions to transfer the torque output away from the front wheels and towards the rear wheels during a reduced-traction condition.

The torque-biasing device 12 of the preferred embodiment includes a conventional electrically-actuated multi-plate clutch, as typically sold under the trade-name TORQUE ON DEMAND by the BorgWarner company. The torque-biasing device 12 may, however, include other suitable devices, such as a hydraulic or viscous-actuated multi-plate clutch or a gear, dog, or cone-type clutch without a multi-plate. The particular choice for the torque-biasing device 12 may vary based on several factors, including the size and layout of the vehicle 16 and the torque output of the engine 22.

Figure 2:
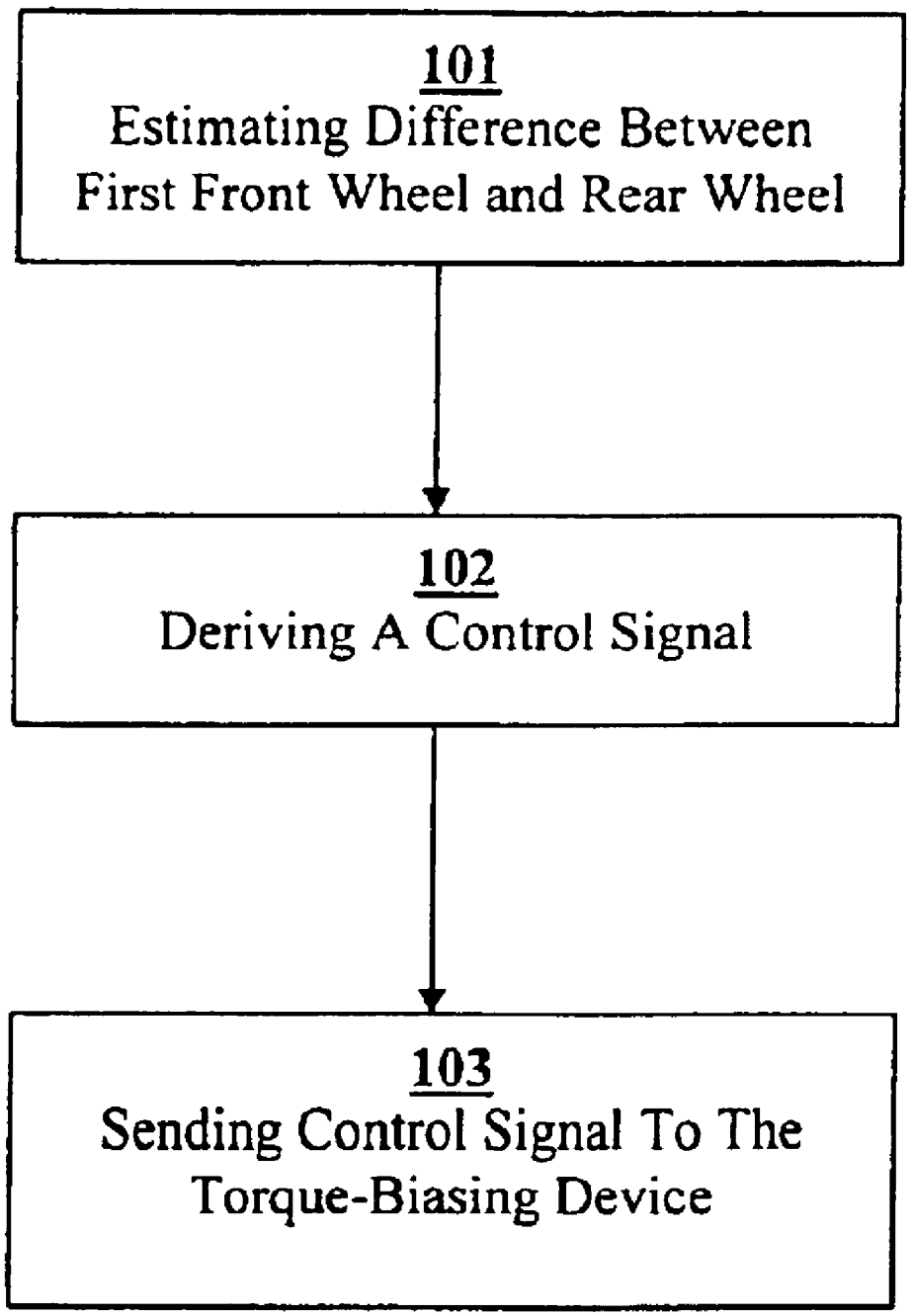
FIG. 2 is a flow chart showing steps of a preferred method of the invention.

The control unit 14 of the preferred embodiment functions to determine when and how to bias the torque output to the front wheels and to the rear wheels 20, and to control the torque-biasing device 12 based on this determination. The first function, determining when and how to bias the torque output, is preferably accomplished in two steps. In the first step 101 in FIG. 2, the control unit 14 estimates a difference between the first front rotational speed and the rear rotational speed caused by the turning maneuver. In the second step 102 in FIG. 2, the control unit 14 derives a control signal based upon the estimated difference caused by the turning maneuver subtracted from a measured difference between the first front rotational speed and the rear rotational speed. Once a signal has been derived, the signal is sent to the torque biasing device, as indicated at 103 of FIG. 2.

The first step 101, estimating a difference caused by the turning maneuver, is preferably accomplished by receiving data for the first front rotational speed and the rear rotational speed and by using a series of mathematical algorithms based on a simplified geometry of the vehicle 16. The data is preferably sent and received in any suitable format and by any suitable means, such as a communication's cable.

The rotational speed difference of the first front wheel 18 and the rear wheel 20 caused by the reduced-traction situation, shown as $\Delta\omega$, is calculated with the following equation: $\Delta\omega = \Delta\omega_m - \Delta\omega_{tt}$. In this equation, the $\Delta\omega_m$ value is the rotational speed difference measured by a suitable sensor and communicated to the control unit 14, and the $\Delta\omega_{tt}$ value is the rotational speed difference caused by the tight turning maneuver and estimated with the followings equation:

$$\Delta\omega_{tt} = \frac{v_f}{r_{wf}} - \frac{v_r}{r_{wr}} = \left(\frac{R_f}{r_{wf}} - \frac{R_r}{r_{wr}}\right)\frac{v}{R}.$$

In this equation, the $v_f$, $v_r$, and $v$ values are the velocities of the first front wheel 18, the rear wheel 20, and the vehicle 16, respectively, and are measured by a suitable sensor and communicated to the control unit 14. The constants $r_{wf}$ and $r_{wr}$ of the equation are the tire radii of the first front wheel 18 and the rear wheel 20. The $R_f$, $R_r$, and R values are the turning radii of the first front wheel 18, the rear wheel 20, and the vehicle 16, respectively, and are estimated with the following equations:

$$R_f = \sqrt{R^2 + l_f^2 - 2Rl_f\cos\left(\frac{\pi}{2} + \beta\right)} \quad R_r = \sqrt{R^2 + l_r^2 - 2Rl_r\cos\left(\frac{\pi}{2} - \beta\right)}.$$

In these equations, the $l_f$ and $l_r$ constants are the longitudinal distance from the center of gravity of the vehicle 16 to the first front wheel 18 and the rear wheel 20, respectively, while the $\beta$ value is the body slip angle.

The $\beta$ value is preferably obtained with the following equations:

$$\beta = \frac{l_r}{R} - \alpha_r = \frac{l_r}{R} - \frac{M_r V^2}{2C_r R} = \frac{2C_r l_r - m_r v^2}{2C_r R}.$$

In these equations, the $\alpha_r$ value is a wheel slip angle of the rear wheel 20, the $C_r$ constant is the spring constant of the rear wheel 20, and the $M_r$ value is the cornering force on the rear wheel 20 measured by a suitable sensor and communicated to the control unit 14. By using these constants and measured variables in the above algorithms, the R value—representing the turning radius of the vehicle 16—is the only other variable needed to calculate $\Delta\omega_{tt}$.

The turning radius of the vehicle 16 may be derived in two ways. The first method uses the rotational speed of the first front wheel 18 and the rotational speed of a second front wheel 24 in the following equation:

$$R = \frac{t(V_{out} + V_{in})}{(V_{out} - V_{in})}.$$

In this equation, the t constant is the track of the vehicle 16 (the measurement between the first front wheel 18 and the second front wheel 24) and the $V_{out}$ and $V_{in}$ values are the rotational speeds of the "outer turning wheel" of the first and second front wheels 18 and 24 and the "inner turning wheel" of the first and second front wheels 18 and 24, respectively. The $V_{out}$ and $V_{in}$ values are measured by the suitable sensors, as discussed above.

The drawback of this algorithm, however, is the high dependency on the rotational speed of the wheels of the vehicle 16. Because of this dependency, this algorithm may sometimes improperly handle a reduced-traction situation where one or two wheels are spinning at a relatively fast rotational speed. This problem can be overcome, however, by assuming a steady state handling response and by using the steering wheel angle, as shown in the following equation:

$$R = (l_f + l_r + Kv_x)\frac{SSR}{\delta_{SWA}}.$$

In this equation, the K constant is a stability factor, the $V_x$ value is a measured longitudinal velocity of the vehicle 16, the SSR constant is a total steering system ratio of the vehicle 16, and the $\delta_{swa}$ value is the steering wheel angle. The data for the steering wheel angle is measured by a suitable sensor and communicated to the control unit 14.

After the first step, estimating a difference between the first front rotational speed and the rear rotational speed caused by the turning maneuver, the control unit 14 proceeds to the second step 102 and derives a control signal. The control signal is preferably based upon the estimated difference caused by the turning maneuver subtracted from the measured difference between the first front rotational speed and the rear rotational speed.

The second function of the control unit 14, controlling the torque-biasing device 12, is preferably accomplished by sending the control signal to the torque-biasing device 12. The control signal is preferably sent and received in any suitable format and by any suitable means, such as a communications cable.

As any person skilled in the art of torque-biasing systems will recognize from the previous detailed description and from the figures and claims, modifications and changes can be made to the preferred embodiments of the invention without departing from the scope of this invention defined in the following claims.

We claim:

1. A method for controlling a torque-biasing device for a vehicle during a turning maneuver having a first front wheel with a first front rotational speed and a rear wheel having a rear rotational speed, comprising:

estimating a difference between the first front rotational speed and the rear rotational speed caused by the turning maneuver;

receiving data on the first front rotational speed, a second front rotational speed of a second front wheel of the vehicle, and the rear rotational speed;

calculating a measured difference based on the data of the first and second front rotational speeds and the rear rotational speed;

deriving a control signal based upon the estimated difference caused by the turning maneuver subtracted from the measured difference; and sending the control signal to the torque-biasing device.

2. The method for controlling the torque-biasing device of claim 1, wherein estimating the difference caused by the turning maneuver includes using the first and second front rotational speeds and the rear rotational speed.

3. The method for controlling the torque-biasing device of claim 2, further comprising receiving data on a steering wheel angle of a steering device of the vehicle.

4. The method for controlling the torque-biasing device of claim 3, wherein estimating the difference caused by the turning maneuver includes using the steering wheel angle.

5. A torque-biasing system for a vehicle having a first front wheel with a first front rotational speed and a rear wheel with a rear rotational speed, comprising:

a torque-biasing device; and a control unit adapted to estimate a difference between the first front rotational speed and the rear rotational speed caused by a turning maneuver, to receive data on the first front rotational speed, a second front rotational speed of a second front wheel of the vehicle, and the rear rotational speed, to calculate the measured difference based on the data of the first and second front rotational speeds and the rear rotational speed, to derive a control signal based upon the estimated difference caused by the turning maneuver subtracted from the measured difference, and to send the control signal to said torque-biasing device.

6. The torque-biasing system of claim 5, wherein said control unit is further adapted to receive data on a steering wheel angle of a steering device of the vehicle.

7. A method for controlling a torque-biasing device for a vehicle during a turning maneuver having a first front wheel with a first front rotational speed and a rear wheel having a rear rotational speed, comprising:

receiving data on the first front rotational speed, a second front rotational speed of a second front wheel of the vehicle, and the rear rotational speed;

estimating a difference between the first front rotational speed and the rear rotational speed caused by the turning maneuver by using the first and second front rotational speeds and the rear rotational speed;

deriving a control signal based upon the estimated difference caused by the turning maneuver subtracted from a measured difference between the first front rotational speed and the rear rotational speed; and sending the control signal to the torque-biasing device.

8. The method for controlling the torque-biasing device of claim 7, further comprising calculating the measured difference based on the data of the first and second front rotational speeds and the rear rotational speed.

9. The method for controlling the torque-biasing device of claim 7, further comprising receiving data on a steering wheel angle of a steering device of the vehicle.

10. The method for controlling the torque-biasing device of claim 9, wherein estimating the difference caused by the turning maneuver includes using the steering wheel angle.

* * * * *